US010310274B1

(12) United States Patent
Reichow (10) Patent No.: US 10,310,274 B1
(45) Date of Patent: Jun. 4, 2019

(54) STACKED WAVE GUIDE SYSTEM PROVIDING DEPTH AND ANIMATION

(71) Applicant: DISNEY ENTERPRISES, INC., Burbank, CA (US)

(72) Inventor: Mark A. Reichow, Valencia, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/991,024

(22) Filed: May 29, 2018

(51) Int. Cl.
*G02F 1/01* (2006.01)
*G02B 27/01* (2006.01)
*G02B 27/02* (2006.01)

(52) U.S. Cl.
CPC ....... *G02B 27/026* (2013.01); *G02B 27/0101* (2013.01); *G02F 1/011* (2013.01); *G02F 1/0105* (2013.01); *G02F 2001/0113* (2013.01)

(58) Field of Classification Search
CPC .............. G02B 27/026; G02B 27/0101; G02B 6/0036; G02B 6/0041; G02B 6/0043; G02B 6/0061; G02B 6/0046; G02F 1/011; G02F 1/0105; G02F 2001/0113; G02F 1/133606; F21V 7/04; F21V 2200/30
See application file for complete search history.

(56) References Cited

U.S. PATENT DOCUMENTS

| 5,963,280 A * | 10/1999 | Okuda | G01C 21/365 349/64 |
|---|---|---|---|
| 8,033,706 B1 * | 10/2011 | Kelly | G02B 6/0036 362/307 |
| 10,209,429 B2 * | 2/2019 | van de Ven | G02B 6/0021 |
| 2011/0157242 A1 * | 6/2011 | Wang | G09G 3/3426 345/690 |
| 2016/0377798 A1 * | 12/2016 | Dhar | G02B 19/0019 362/19 |
| 2017/0115443 A1 * | 4/2017 | Couch | G02B 6/0003 |
| 2019/0032304 A1 * | 1/2019 | Bolz | G02B 27/0179 |

* cited by examiner

*Primary Examiner* — Joseph L Williams
*Assistant Examiner* — Jose M Diaz
(74) *Attorney, Agent, or Firm* — Marsh Fischmann & Breyfogle LLP; Kent A. Lembke (57) ABSTRACT

A display system adapted to display images with animation and depth without requiring a viewer to wear special 3D eyewear. The system includes a controller and a programmable light source operating in response to control signals from the controller to output light. The system further includes an edge-lit layer with an edge optically coupled to the programmable light source, and the output light is trapped in the layer with total internal reflection (TIR), The layer is divided into first and second segments, and an optical barrier is inserted between the segments. First and second display areas, such as etched graphics, are provided on surfaces of the two segments, and the display areas are configured to enable the light trapped via TIR to escape. Independent lighting of the segments can be used to provide animation. Depth is provided by stacking one-to-many additional similar layers on the first layer.

20 Claims, 6 Drawing Sheets

STACKED WAVE GUIDE SYSTEM PROVIDING DEPTH AND ANIMATION

BACKGROUND

1. Field of the Description

The present description relates, in general, to displays adapted to provide a three-dimensional (3D) animated image or an image with volume and motion or changes over time. More particularly, the description relates to systems and methods for using static edge lighting or wave guide techniques to provide imagery with both depth and animation.

2. Relevant Background

Today, there is a growing demand for displays with exciting and eye-catching visual effects. For example, there is a growing trend toward using 3D projection techniques in theatres and amusement parks and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

In many environments, however, 3D projection systems are prohibitively expensive, are not well-suited to the higher light environments such as outdoor or brightly lit indoor displays, or are not suited to the limited space requirements. As a result, there is a continuous desire and need to provide new techniques that provide cost effective but eye-catching content with depth and, in many cases, animation. For example, it is desirable to grab the attention of crowds in shopping malls, on busy streets, in amusement parks, and other crowded facilities such as airports and entertainment arenas. As discussed above, 3D imagery and volumetric displays with moving imagery or animation are exciting ways to appeal to viewers and hold their attention. However, the use of 3D imagery has, in the past, been limited by a number of issues. Typically, 3D projection technologies require the viewer to wear special viewing glasses. This is often inconvenient for many applications and can significantly add to costs to provide the 3D media for projection and also for the special eyewear that has to be provided to the viewer.

Some attempts have been made in providing volumetric displays without the need for eyewear, but each has its own limitations. For example, displays providing a scrim projection or traditional Pepper's Ghost illusion are common tools used throughout amusement parks and other settings. These displays allow placement of a virtual character or object (i.e., a ghost, a video of a character, or the like) within a real world scene. A scrim projection is usually accomplished by using a projection onto a scrim (e.g., an open weave material appearing transparent when lit from behind but providing a projection surface when lit from the front or viewer's side) while a Pepper's Ghost is a reflection of a display in a beam splitter. Unlike directly viewing an opaque monitor, the scrim and the beam splitter are partially transparent to the viewer (even when lit from the front) so the displayed character is not framed by the display. The virtual character can be placed relatively seamlessly behind real world objects or props (foreground elements) and in front of real world objects or props (background surfaces and elements). Unfortunately, the partial transparency of the scrim or the beam splitter also leads to the virtual character having low contrast and being semi-transparent, and the images produced are often relatively small in size.

Hence, there remains a need for a display system that is adapted to produce 3D or volumetric images without the need for viewers to wear special eyewear that it is not projected upon a projection screen or other surface. Preferably, the display system would be can be large in scale and, in many applications, produce imagery that is visible to the viewer not only in dark rooms or spaces but also in more highly illuminated rooms or spaces (e.g., a volumetric and animate image(s) in an outside space near a queue for a ride or attraction at an amusement or theme park or in a lobby of a movie theater or on a ride car that moves in and out of dark spaces.

SUMMARY

To address the above problems and ongoing needs, a display system is provided that is adapted to display images with animation and depth without requiring a viewer to wear special 3D eyewear. The system includes a controller and a programmable light source operating in response to control signals from the controller to output light. The system further includes an edge-lit layer with an edge optically coupled, such as via one or more waveguides, to the programmable light source, and the output light is trapped or retained in the layer with total internal reflection (TIR). The layer is divided into first and second baffled segments, and an optical barrier is inserted between the first and second baffled segments. Further, a first display area is provided on a side of the first baffled segment and a second display area is provided on a side of the second baffled segment. The first and second display areas being configured to enable the output light trapped via TIR to be emitted from the layer.

In some embodiments, the layer includes a sheet (which may be a pane or film) of plastic or glass, and the edge of the layer is coupled with at least one waveguide to the programmable light source. In some useful implementations, the programmable light source includes one or more light emitting diodes (LEDs) strips. In such implementations, a first subset of the LEDs provides the output light to the first baffled segment and a second subset of the LEDs provides the output light to the second baffled segment. Then, in practice, the controller independently operates the first and second subsets of the LEDs to sequentially or concurrently illuminate the first and second display areas, whereby displayed images are animated. Further, in some cases, the controller generates the control signals to vary over time at least one of color and brightness for the first and second baffled segments. In some embodiments, the first and second display areas are provided with etched graphics or patterns on the sides (e.g., planar surfaces) of the first and second baffled segments.

To provide an output image with depth, the display system may further include a second layer with an edge optically coupled to the programmable light source, and the second layer is stacked on the first layer by arranging it substantially parallel to the first layer. The second layer includes a third display area on a side of the layer facing the layer (and may include a fourth display area when baffled to include two or more baffled segments as is the first layer). The third display area is configured to enable a portion of the output light trapped via TIR in the second layer to be emitted from the second layer toward the layer. The controller generates the control signals to provide the output light from the programmable light source to the second layer independently from the layer, and its emitted or escaping light passes through the first layer to be concurrently visible with light from the first layer by a viewer in a nearby viewing space.

DETAILED DESCRIPTION

Briefly, a display system is described that is specially configured to produce imagery with depth and animation for a viewer without the need for special 3D glasses or eyewear. The inventor understood that edge light or wave guide lighting of acrylic and glass etched signs have been around and in use in displays for years. These displays are used for advertising and wayfinding purposes, and the common green "EXIT" sign is a good example of use of wave guide displays. Most existing wave guide-based signs are plain, simple single plane monochromatic assemblies. The basic structures are inexpensive and use light emitting diode (LED) lights so that they are robust and energy efficient. However, the state of the art is limited to one color at a time illumination and, more importantly with regard to the present description, is limited to on/off functionality (e.g., the EXIT sign is either entirely illuminated or is dark). Hence, the existing wave guide displays lack the visual draw of even simple animation. Prior wave guide-based displays also lacked dimension in that they were limited to single layer structures.

The inventor was presented with the challenge of designing, fabricating, and implementing a dynamic heads up display (HUD) for a park ride and other applications. The inventor recognized the limitations of existing edge lighting/wave guide displays, but he also understood that the state of the art of wave guide signage was evolving from just acrylic and glass panels or sheets toward the use of very thin films that could produce the same effect as the thicker glass or acrylic devices. With this trend in mind along with the inexpensive and robust qualities of wave guide displays, the inventor determined that a display system could be produced that provided both depth and animation by stacking edge-lit panels of clear plastic (such as an acrylic) or glass (e.g., sections cut from 3 mm to 100 mm thick sheets or the like) and/or by stacking more recently available plastic light guide films (such as those films distributed by FLEx Lighting, LLC, Chicago, Ill., which can presently be as thin as 50 microns).

Specifically, the new display system was developed by stacking and also baffling edge-lit (or wave guide) panels (or layers) in a way that produced depth and a form of animation. The edge lighting assembly is provided in the form of a programmable light source for each of the wave guide panels/layers, with the programmable light sources often taking the form programmable red-green-blue (or other colored) LED strips (such as the QuasarBrite™ line available from Lumex) that can be controlled on a per-baffle level as well as on a layer-by-layer basis over time and in a synchronized manner. The LED strips may be implemented using a range of addressable RGB-SME-LED chips on a flexible PC board to pipe light into the TIR medium, and there are tape light products available today off the shelf for ¼-inch TIR medium (acrylic and glass). Hence, a combination of multi-plane, light baffling, and programmable RGB LED strips is used to create, with the display system, a dynamic display with depth.

Baffling, in this description, refers to optically segmenting a large display volume/area (such as that provided by a wave guide layer or panel in the display system's stack) into zones or segments that are separated by optical barriers that prevent light from spilling between the zones or segments. In large scale implementations, prototypes of the display system were fabricated by slicing up a large display panel (e.g., a thick acrylic film) into two or more segments. The edges of the cut segments were coated with white material to provide the optical barriers prior to gluing the segments back together to form each of the wave guide or edge-lit layers.

The optical barriers (white or reflective films of Mylar or similar material in one embodiment and more generally any process that would effectively reflect and block light) optically isolated the various sections. In the case of thin film wave guide implementations, it is likely that the optical barriers may be provided by etching processes (e.g., photographic, laser-based, or other etching techniques), and such etching-based optical barriers would create sufficient isolation or baffling between adjacent segments and has the advantage that reassembly would not be necessary. This fabrication process is potentially a process that would scale well to high volume manufacturing. In either the thin film or thicker layer examples, multiple wave guide layers or panels can be stacked, such by laminating the panels together, using air gap or other differential index of refraction bonding methods to optically isolate the layers/panels from each other. The use of differential index of refraction film is not required for stacking as one can also use a simple transparent film that isolates the surface of the panels from touching and letting the light out, and, in some cases, the panels can be stuck together (as long as there is no or little moisture). This creates control in three dimensions and can be scaled to arbitrary size. Display areas (or light emission regions) are formed on one of the planar sides of each segment by generating portions of the segments/subsections where light can escape from the total internal reflection (TIR) in the body of the segment/subsection. This may be achieved by etching a pattern on one side (e.g., the side facing a viewing space) of the segment/subsection.

After re-assembly, the isolated sections of each layer/panel can be filled with light independently such as with a layer/panel specific LED strip or other programmable light source, so long as they include an exposed edge that can be coupled with a waveguide to the light source. Hence, each layer subsection or segment can be lit independently to control color, brightness, and timing of the light in each subsection/segment independent of other subsections/segments and/or with synchronized lighting of the other subsections/segments. With the addition of a controller selectively operating the programmable light sources to emit light out of the display areas or regions (or light-emitting portions), the display system is operable to implement a visual display with depth (due to the multiple layers) and animation, shading, and other optical effects so that this inexpensive technology that was previously monotone and dull becomes dynamic and exciting to a viewer. The display system can be used for advertising, wayfinding, and much more including HUDs for park ride and other vehicles, for framing other display devices, and the like.

Figure 1:
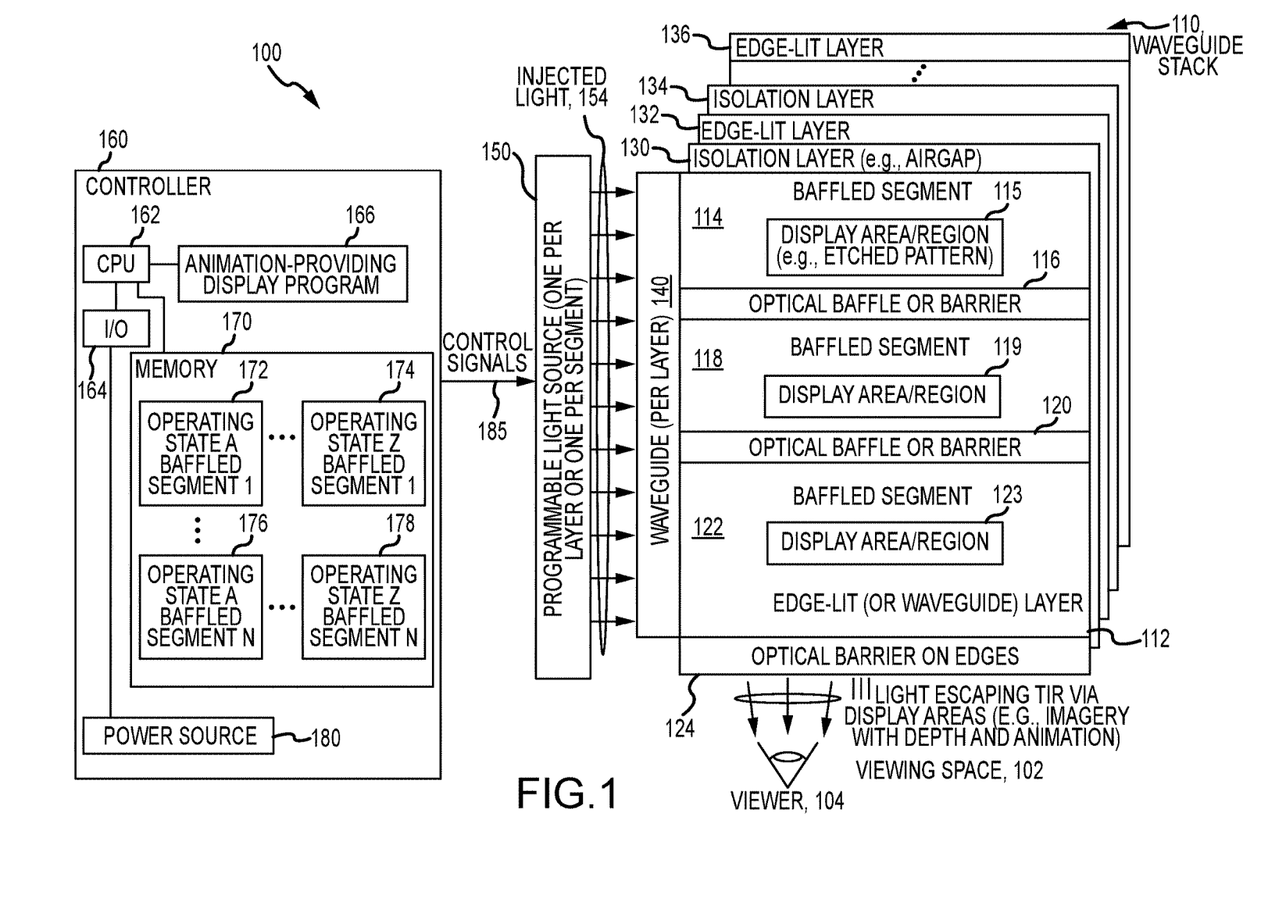
FIG. 1 is a functional block diagram of a display system or assembly of the present description.

FIG. 1 illustrates, with a functional block diagram, a display system 100 that is designed according to the inventor's new concepts for providing imagery with depth and a form of animation in a relatively inexpensive way that does not require a viewer to wear 3D glasses. The display system 100 includes a waveguide stack or assembly 110 that operates in response to control signals 185 transmitted from a controller 160 to output light 111 into a viewing space 102 where it can be perceived by a viewer 104 as images with depth and animation or movement. The light 111 is light that escapes or is emitted via display areas of the stack 110 that are configured to allow it to escape the total internal reflection (TIR) within each stacked panel/layer, and light from rearward panels/layers of the stack 110 pass through more forward panels/layers (e.g., pass through panels/layers between the layer/panel and the viewer 104 in the viewing space 102).

As shown, the stack/assembly 110 includes a first or outer edge-lit (or waveguide) layer (or panel, sheet, or film) 112. The edge-lit layer 112 may be a film, sheet, or pane of any material that is medium that can behave as a light pipe (e.g., can trap light in TIR when light is injected via edge lighting). In some embodiments, clear plastic or glass is utilized for the edge-lit layer, and one particular prototype was formed using thick acrylic while other embodiments are envisioned using thin films (e.g., films distributed by FLEx Lighting, LLC, Chicago, Ill., which can presently be as thin as 50 microns). The thickness can vary widely to implement the stack 110 and may be chosen to achieve a desired depth effect as the thickness of the layers 112 defines the offset of the various displayed images, with thicknesses in the range of 50 microns up to 100 mm being useful.

The layer 112 is adapted to display more than one image, and these images can be independently displayed (or not displayed) during operations of the system 100. These separate images can be used to provide animation or movement in each of the layers 112 such as by sequentially lighting up (and removing light from) the different portions of the layer 112. In the example of FIG. 1, the layer 112 is shown to include three baffled segments 114, 118, and 122, which are rectangular in shape (but other shapes may be useful and provided in the stack 110) and similarly sized (but differently sized segments may be utilized to implement the stack 110 in other embodiments).

The segments 114, 118, 122 are "baffled" in the sense that they are adapted for edge lighting and TIR. To this end, optical baffles or barriers 116, 120 are sandwiched between the segments 114 and 118 and the segments 118 and 122. The optical barriers 116, 120 may be any reflective material that can be applied to edges of the bodies of the segments 114, 118, 122 adjacent another segment and can block the light 154, which is injected into the edge that is coupled with waveguide 140, from escaping. In one embodiment, a Mylar film was utilized as the optical barriers 116, 120. The outer edges of the layer 112 (except for the outer edge coupled to waveguide 140) are covered with another optical barrier 124 to prevent light 154 from escaping the bodies of the segments 114, 118, and 122.

The stack 110 includes a waveguide 140 for each layer 112 that optically couples an edge/end of the layer 112 to a programmable light source 150 (again, provided for each layer 112). The programmable light source 150 selectively is operated over time to output light 154 to the waveguide 140 to provide edge lighting of each segment 114, 118, 122, which is trapped within its body via TIR. The programmable light source 150 may take a number of forms to practice the system 100 with one example being a programmable (or separately controllable) strip of LEDs such as RGB LEDs to allow each segment 114, 118, 122 to be illuminated with light of any desired color.

To display images with light 111 to the viewer 104, each segment 114, 118, 122 includes a display area or region 115, 119, 123. The display areas 115, 119, 123 are configured to enable light trapped in the body of the segments 114, 118, 122 via TIR to escape. In other words, the display areas 115, 119, 123 define the shape, size, and location of the image(s) that are viewable by the viewer 104 via light 111 upon the light 154 being provided to the segments 114, 118, and 122 by light source 150. In one useful embodiment, the display areas 115, 119, and 123 were formed by etching a pattern of a desired image(s) on one of the sides of the body of each of the segments 114, 118, and 122, and each of these etched sides were positioned to face (or to be more proximate to) the viewing space 102 to direct the escaping light 111 toward the viewing space 102 and viewer 104.

Animation, in layer 112, can be provided by sequentially illuminating the baffled segments 114, 118, and 122 such as to have an object first be displayed on segment 114 (only illuminate segment 114) and then on segment 118 (only illuminate segment 118) and then on segment 122 (only illuminate segment 122), to have a bar or other shape of a HUD change its size by first only illuminating segment 122 then segment 118 followed by segment 114 (or vice versa), and so on.

Depth in the imagery displayed to the viewer 104 with light 111 is achieved by stacking additional edge-lit layers onto the layer 112. Each additional layer may be configured similar to the layer 112 with similarly sized and shaped baffled segments or each additional layer may differ such as with a greater or lesser number of baffled segments or with differently shaped and/or sized baffled segments. In some cases, the layers may even differ in size and/or shape, but stacking like sizes and shapes of the layers 112 may be preferable as it simplifies fabrication of the waveguide stack 110.

As shown, the waveguide stack 110 includes additional edge-lit layers 132, 136 such that the stack 110 includes two-to-many layers, and it is likely that having a number of layers in the range of 2 to 10 will be desirable in most applications. Each layer 132, 136 is optically coupled via a waveguide 140 to a programmable light source 150 so that light 154 can be injected into one of its edges/ends in a selective manner. In this way, each edge-lit layer 112, 132, 136 can be independently edge-lit and each baffled segment (such as segments 114, 118, 122) in each layer 112, 132, 136 can be independently edge-lit (with any desired color and such colors may be changed over time when the light source includes RGB light sources such as programmable LEDs). In the stack 110, each baffled segment is separately addressable (via the light source 150) such that the segments in the various layers 112, 132, 136 can be edge-lit concurrently or at different times to achieve a desired visual effect.

An isolation layer 130, in the form of an air gap or other differential index of refraction technique, is provided as part of fabrication (e.g., by laminating the layers 112, 132, 136 together) of the stack 110 so as to optically isolate the layers 112, 132, 136 from each other. As with layer 112, each segment 132, 136 includes at least one display area/region, which may be an etched pattern (or 2D graphic) defining a shape, size, and location of an image to be displayed that is provided on one side of the segment's body (e.g., a planar side of a thin film or pane/sheet of clear plastic or glass) and this etched side is positioned in the stack 110 to face the viewing space 102 to direct light 111 toward viewer 104 (after passing through layer 112 and layer 132 (in the case of layer 136)). In this manner, the light 111 and associated displayed images appear to be physically located on differing planes in the stack 110 so as to provide depth to the overall display produced by the display system 100 (e.g., a 3D graphic).

The display system 100 includes a controller 160 for generating control signals 185 to operate the programmable light source 150 (which may take the form of a strip of RGB LEDs per layer 112, 132, 136 or per baffled segment). The controller 160 is shown to include a processor 162 that executes code or instructions to perform the functions of an animation-providing display program 166. The controller 160 includes input and output (I/O) devices 164 (e.g., a monitor and graphical user interface (GUI), a touchscreen with a GUI, a keyboard, a mouse, voice recognition software and devices, and the like) allowing a user/operator to provide input such as to load a particular display program 166 for operating the waveguide stack 110 and to start and stop the loaded program 166. The controller 160 also includes a power source 180 (or is coupled to an offboard power source), and the control signals 185 may include (or be) power for the light source 150 (e.g., for powering on particular LEDs).

The controller 160 includes memory 170 (or has access to memory 170 if provided offboard), and the memory 170 is shown to store operating states 172, 174, 176, and 178 defining two or more operating states for each baffled segment of the waveguide stack 110. The operating states 172, 174, 176, and 178 may indicate whether a baffled segment is to be edge lit or not, the color the lighting should be when the light source 150 is an RGB light source, and the brightness level should be used for the segment. The display program 166 defines which operating states to use for each baffled segment and the timing of each operating state 172-178 and, in response, generates the control signals 185 to operate the programmable light source 150.

Figure 2:
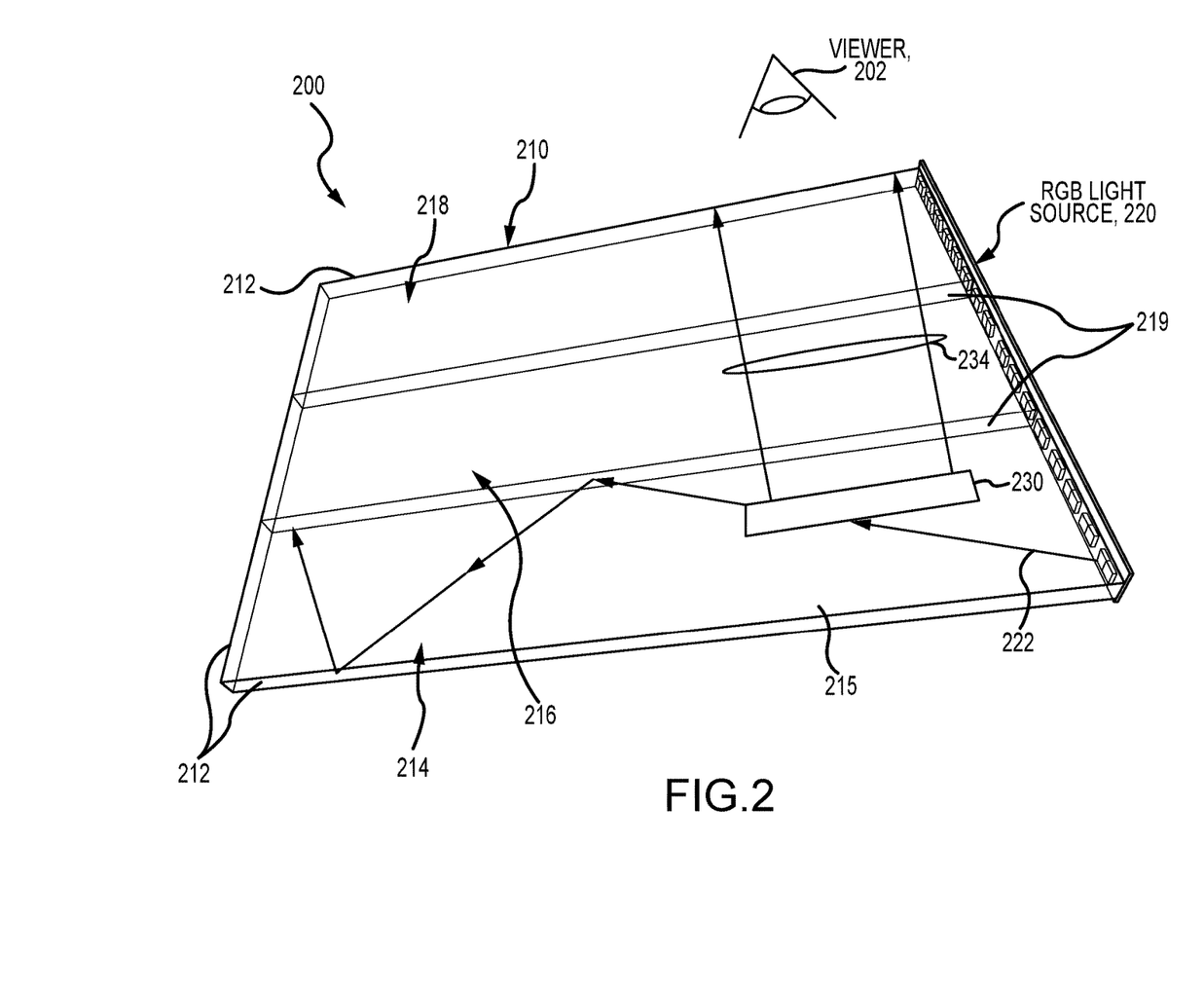
FIG. 2 is a perspective view of a portion of a display system of the present description showing more details of a single edge-lit layer or pane of a waveguide stack.

FIG. 2 is a perspective view of a portion of a display system 200 of the present description showing more details of a single edge-lit layer or pane 210 that would be included in a waveguide stack (such as stack/assembly 110 of FIG. 1). The display system 200 is being operated to provide imagery to a viewer 202 in a nearby viewing space. The display system 200 includes an edge-lit layer 210 formed of a sheet, pane, or film of clear material (or a medium) that is useful for TIR (or is "light-pipable"), and the layer 210 may be formed of an acrylic sheet, a pane of window glass, or a thin (or thick) film of plastic. The layer 210 has optical barriers 212 applied to its edges to reflect light back into its body to retain TIR.

The layer 210 is formed into three segments 214, 216, 218, which are optically separated by a thin reflective layer or optical barrier 219 sandwiched between the segments (i.e., between adjacent segments 214 and 216 and adjacent segments 216 and 218) that acts to reflect light back into the body of each segment 214, 216, 218 to retain TIR and that is invisible to the eye of the viewer 202 from the intended view (e.g., generally orthogonal to the edge-lit layer's outward or front surface). A programmable light source 220 in the form of an RGB LED strip is provided along one edge of the edge-lit layer and is optically coupled to an edge of each of the segments 214, 216, 218 (such as with a waveguide(s)), and, as discussed with reference to FIG. 1, each baffled segment 214, 216, 218 is addressable by a controller that can selectively operate the light source 220 to inject light of any color into the segment's body.

In FIG. 2, the light source 220 is being operated to inject light 222 into the body of segment 214, and the light 222 is trapped in the body of the segment via TIR as it reflects off of the optical barriers 212 and 219. A display area/region 230 in the form of an etched graphic is provided on an outer surface/side 215 of the segment 214. As a result, light 234 (a portion of the injected light 222 from the source 220) escapes or is emitted from the surface/side 215 of the segment 214 in the shape of the etched graphic/pattern and with a color defined by the operation of the RGB light source 220 (e.g., by illuminating LEDs of a particular color or a desired combination). The viewer 202 does not observe the light trapped in TIR, and only perceives the etched graphic/display area 230 as light 234 escapes the body of the segment 214. Although not shown in FIG. 2, etched graphics (display areas) would also be formed on segments 216 and 218, and the RGB light source 220 would be selectively operated to inject light of a desired color into the bodies of these segments 216 and 218 concurrently with segment 214 (e.g., to illuminate a graphic or image that extends over more than one segment of the layer) or sequentially to provide animation in the edge-lit layer 210.

Figure 3A:
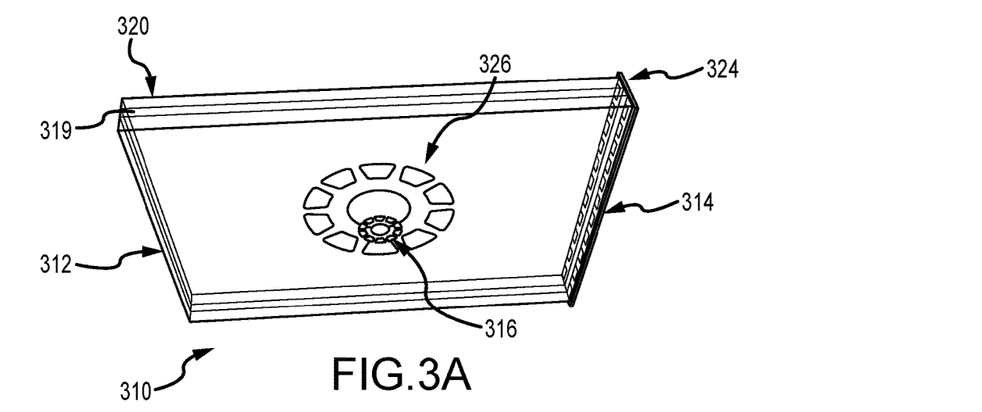
FIGS. 3A-3C illustrate top perspective, side perspective, and front views, respectively, of a waveguide stack of a display system during its operation to show depth and proper parallax provided by the presently described display systems.
Figure 3B:
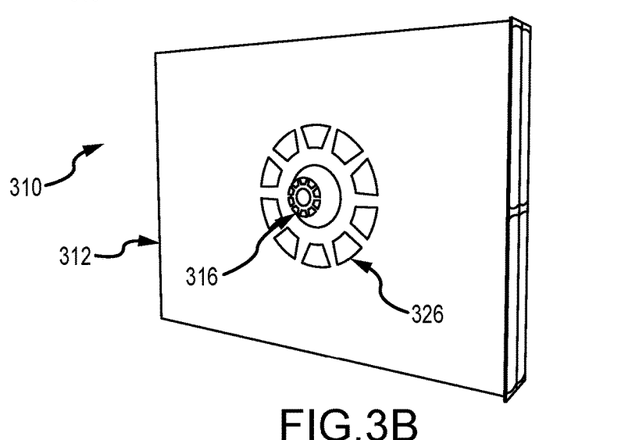
Figure 3C:
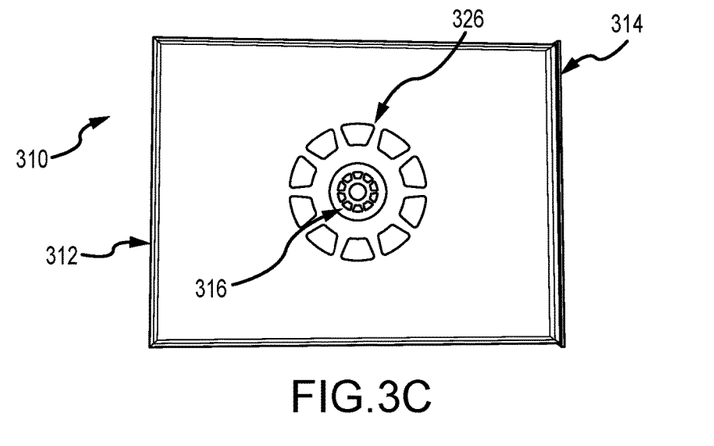

FIGS. 3A-3C illustrate top perspective, side perspective, and front views, respectively, of a waveguide stack 310 of a display system (such as system 100 of FIG. 1) during its operation to show depth and proper parallax provided by the presently described display systems. In the stack/assembly 310, a first or outer layer 312 of a light-pipable medium is edge-lit by a light source 314, and, as a result, a display area (e.g., an etched graphic) 316 is visible via light escaping the body of the segment 312. The stack/assembly 310 includes a second or inner layer 320 (spaced apart from the first or outer layer 312 via air gap 319) that has its planar body (e.g., a sheet, film, or pane of clear plastic, glass, or the like) arranged parallel to the planar body of the first or outer layer 312.

The second or inner layer 320 is edge-lit by a second light source 324 (concurrently or sequentially with concurrently being shown), and, as a result, a display area (e.g., an etched graphic) 326 is visible via light escaping the body of the segment 320. As can be seen in FIGS. 3A-3C, the two illuminated display areas/etched graphics 316, 326 are located in different, spaced-apart planes (i.e., the surfaces/sides of the segments 312, 320 facing and proximate to the viewing space (in this embodiment)) so that the stack 310 provides imagery with depth and with proper parallax regardless of the viewing angle (or position of the viewer in the viewing space). Only one segment is shown per layer to simplify the example, but it will be understood that each layer 312, 320 may also include two or more baffled segments so as to provide animation within each layer and/or to provide different display areas/patterns/graphics independently within each layer of a stack 310.

Figure 4:
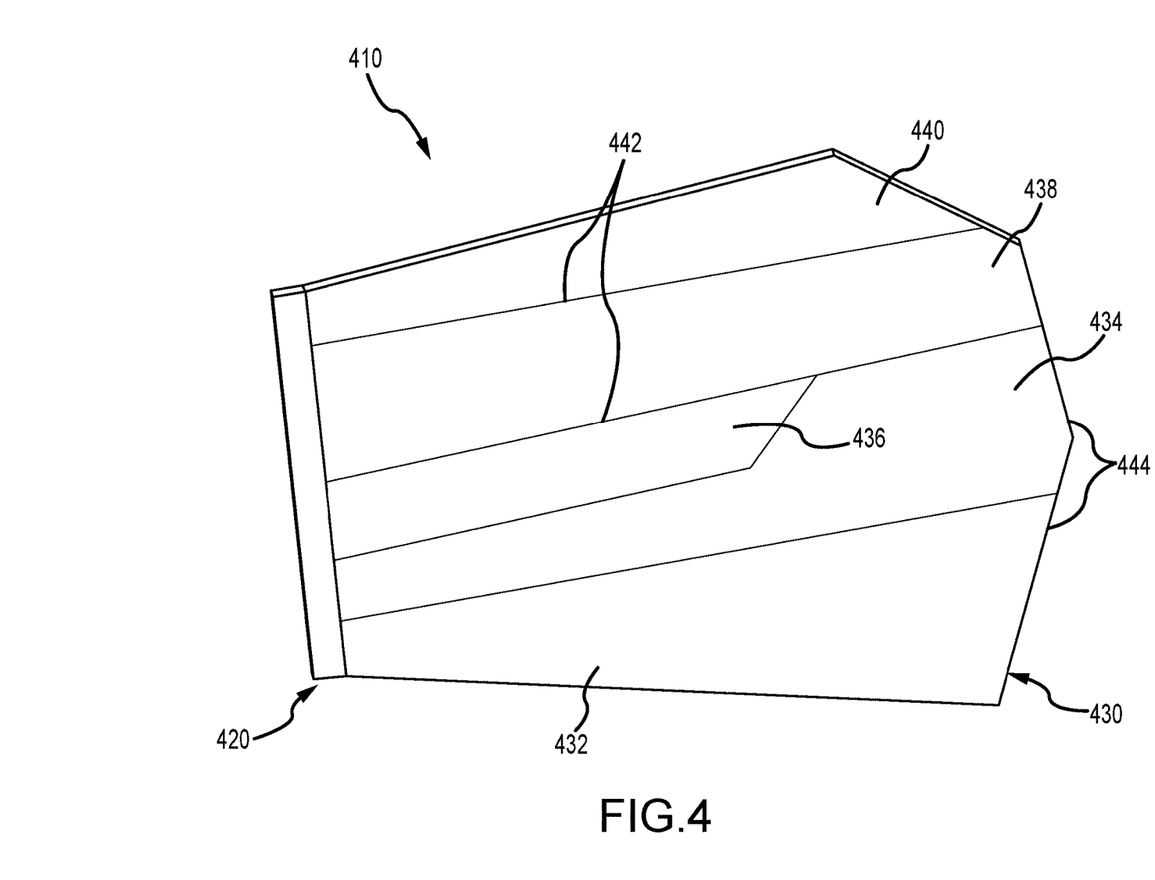
FIG. 4 is a front view of another embodiment of a waveguide stack that may be used in a display system of the present description showing use of multiple baffled segments with more irregular and varying shapes and sizes.

FIG. 4 is a front view of another embodiment of a waveguide stack or assembly 410 that may be used in a display system of the present description (such as system 100 of FIG. 1) showing use of multiple baffled segments with more irregular and varying shapes and sizes. As shown, the stack 410 includes a programmable light source 420, which may take the form of a strip(s) of RGB LEDs for each edge-lit layer of the stack 410 so that each baffled segment can be separately illuminated with colored edge lighting. The outer layer 430 of the stack 410 is shown to include five baffled segments 432, 434, 436, 438, and 440 with inner mating edges covered with optical barriers 442 and with outer edges covered with optical barriers 444.

Each segment 432, 434, 436, 438, and 440 is formed of a sheet, pane, or film of material that is suited for use as a light pipe (or for edge lighting and TIR) and has an outward facing side/surface (planar in this non-limiting example) that has a display area (such as an etched pattern or graphic). The light source 420 may be operated to independently inject light into the segments 432, 434, 436, 438, and 440 via an edge optically coupled (such as via a waveguide) to the source 420, and this may involve sequentially lighting (and unlighting) different segments 432, 434, 436, 438, and 440 so as to create animation on the edge-lit layer 430. Light, as discussed above, escapes the body of the segments 432, 434, 436, 438, and 440 via their display areas. The layer 430 shows that the segments may have be irregular in shape (do not have to be rectangular) to still trap light with TIR, may differ in size and/or shape from each other, and do not have to extend from the light source 420 to outer edges (see segment 436 for example). The stack 410 may include one to many more of edge-lit layers, and each may be configured with baffled segments similar to those of layer 430 or with differing numbers, sizes, and/or shapes of such segments.

Figures 5A, 5B:
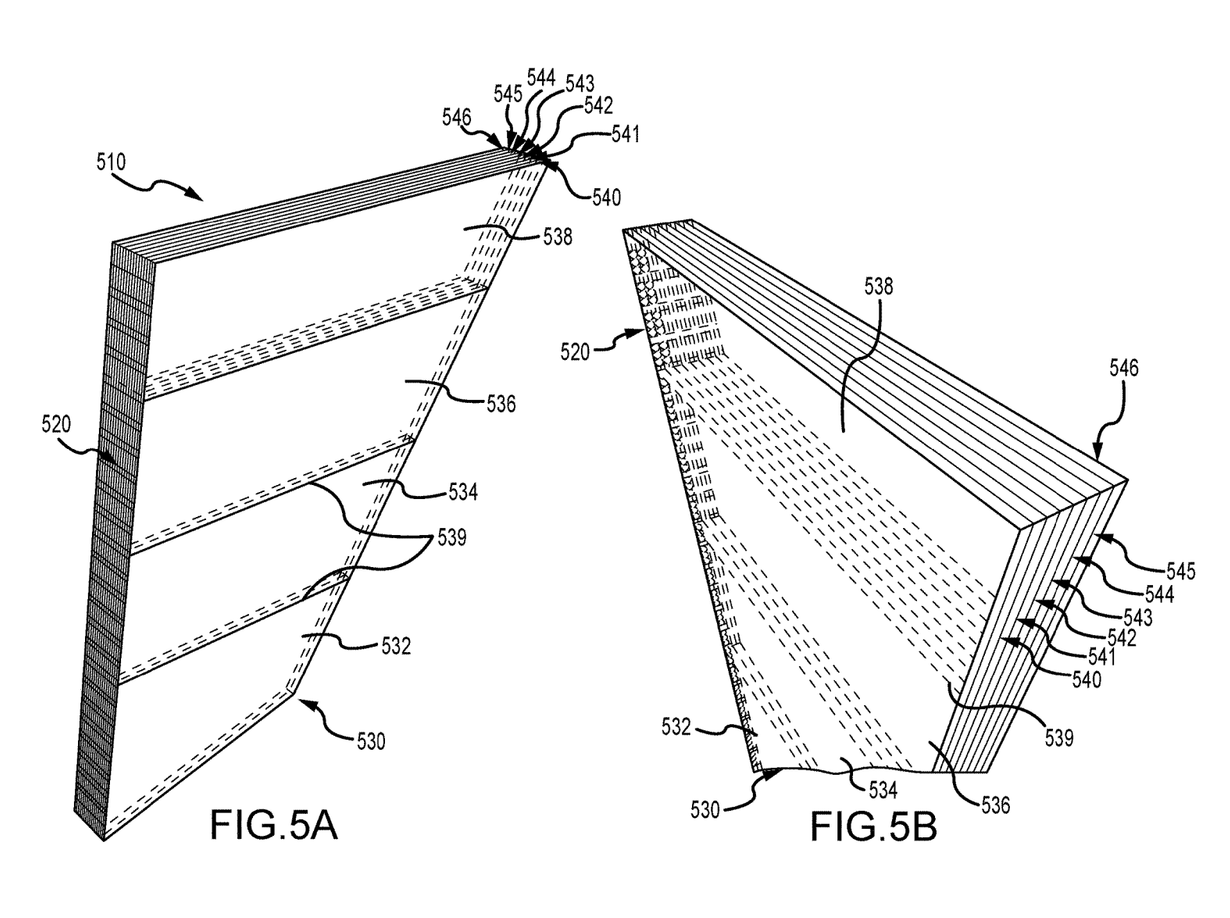
FIGS. 5A and 5B shows left and right top perspective views of another embodiment of a waveguide stack that may be used in a display system of the present description.

FIGS. 5A and 5B illustrates top perspective views of another embodiment of a waveguide stack or assembly 510 of the present description that may be used in a display system (such as system 100 of FIG. 1). The waveguide stack 510 includes an outer, front, or first edge-lit layer 530 that is formed of light-pipable medium. The layer 530 is cut or divided into four segments 532, 534, 536, and 538 that are separated from each other by optical barriers or baffles 539 (and outer edges would also likely be covered with reflective material to maintain TIR in the segment bodies). Although not shown, display areas/regions are formed on a side/ surface of each segment, such as through etching of a particular pattern or graphic, and a programmable light source 520 is provided on the stack 510 that is operable to independently light via optical coupling light (of any desired color) an edge of each of the segments 532, 534, 536, and 538. This light is trapped via TIR except where it can escape in the display area/region. The stack 510 further includes seven more layers 540-546 for a total of eight layers (which in one prototype were 1/16-inch thick panes or sheets of acrylic) to provide depth and animation (in some cases) in various layers. The layers may be joined as discussed above via lamination with an air gap or other techniques.

Figure 6:
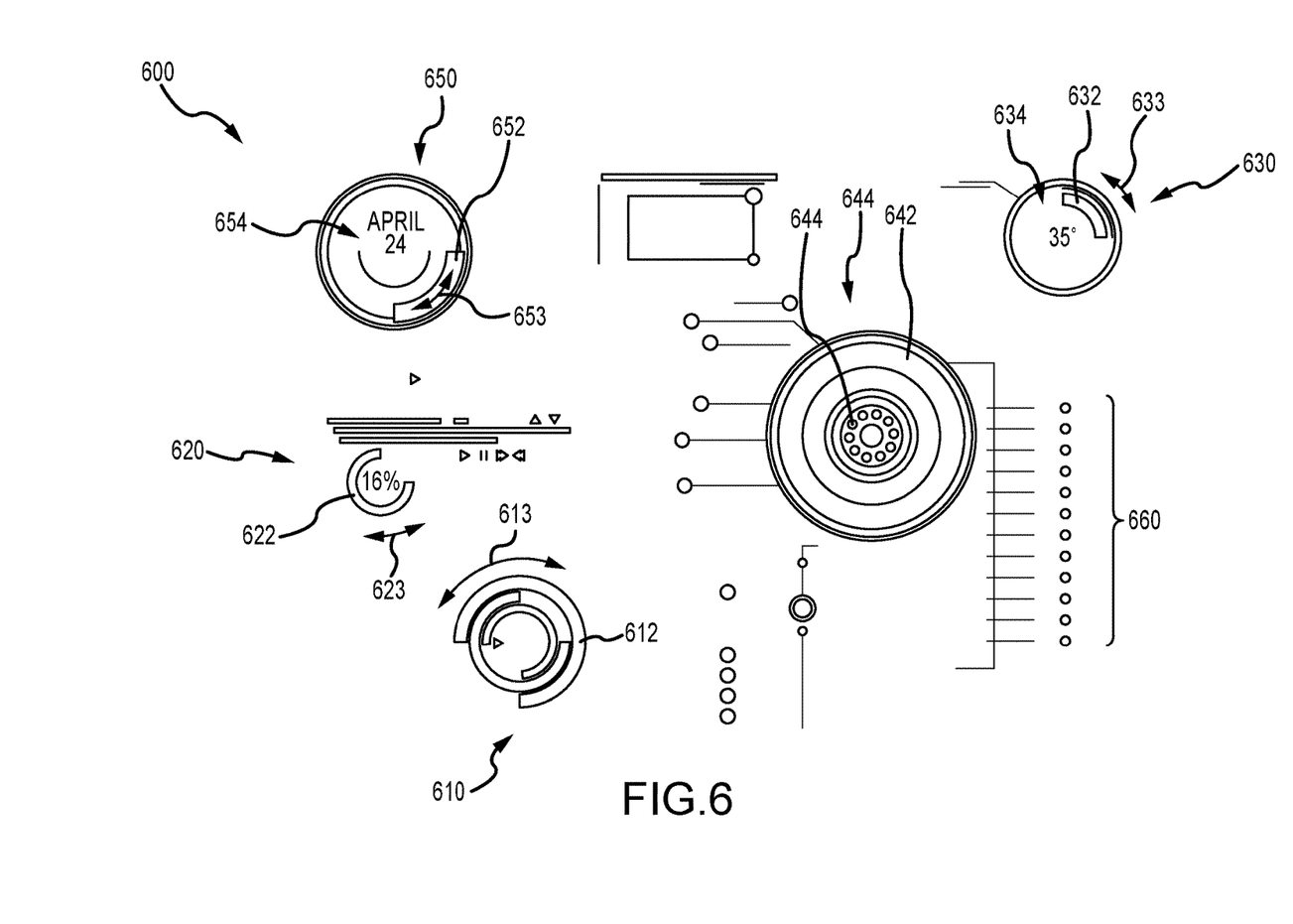
FIG. 6 illustrates a HUD provided by operations of a display system of the present description.

FIG. 5 illustrates an overall displayed image, e.g., a HUD, provided by operation of a display system of the present description via use of a waveguide stack with two or more waveguide layers with at least some of these layers including two or more baffled segments. As shown, the HUD 600 includes a first 3D component 610 that includes a circular feedback bar 612 that is shown to extend about a fixed center portion (or gage components). The fixed portion may be provided, for example, on the outer or first layer of the waveguide stack, and depth is created for the 3D component 610 by presenting the feedback bar 612 on a second or inner layer spaced apart from the first or outer layer. Animation is provided as shown with arrow 613 by causing the feedback bar to move overtime, and this may be achieved by sequentially illuminating two or more baffled segments of the waveguide layer used in the stack to display the feedback bar 612.

A second 3D component 630 is provided that has depth because an outer ring is presented in the first or outer layer while a circular feedback bar 632 is provided on an inner or second layer spaced apart a distance from the first or outer layer. Animation or motion is provided by operating two or more baffled segments of this inner/second layer to first display the bar 632 with a first length and then at a second/later time to have the bar 632 have a greater length. Animation and depth is also provided by an inner feedback graphic 634 (e.g., a number in this case), which can be displayed on two or more inner layers spaced apart from the outer or first layer and which can change over time (such as by having overlapping display areas/regions on two or more layers to change the numbers over time such as to provide a speedometer readout). Graphical component 650 is similar with its feedback bar 652 that appears to move 653 over time by changing its length by illuminating sequentially one, two, or more baffled segments. Graphical component 650 also includes an inner graphical element 654 in the form of a numerical feedback graphic, which can be changed over time by using overlapping display regions on two or more layers of the waveguide stack that also provides depth to the HUD 600.

The HUD 600 further is shown to include another 3D graphical component that may include a fixed outer ring 642 that may be provided on an ongoing basis on an inner or lower layer of the waveguide stack. A center graphical element 644 may be selectively displayed on the first or outer layer to provide depth and also to provide a form of animation to the HUD (e.g., the HUD changes its appearance over time by addition and deletion of components). The HUD 600 may further be "animated" by presenting graphical component 660 that may be varied over time by adding or deleting graphics (e.g., text, numbers, symbols, or the like providing feedback, in a table or list form, to the viewer of the HUD), and the graphics in component 660 may be provided by operation of one layer and one-to-many of its baffled segments or by operation of two or more layers of the waveguide stack configured and operated to provide a display image or output in the form of the HUD 600.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, a semi-reflective film, such as Mylar or the like, can be provided on the back of sections. This is useful to create additional depth. In one prototype, the inventor used a black acrylic on the display assembly to make the edge lit panel reflect one layer more, e.g., to basically provide a controlled "infinity mirror illusion."

I claim:

1. A display system adapted to display images with animation and depth, comprising:
    a controller;
    a programmable light source operating in response to control signals from the controller to output light; and
    a layer with an edge optically coupled to the programmable light source, whereby the output light is trapped in the layer with total internal reflection (TIR),
    wherein the layer is divided into first and second baffled segments,
    wherein an optical barrier is inserted between the first and second baffled segments, and
    wherein a first display area is provided on a side of the first baffled segment and a second display area is provided on a side of the second baffled segment, the first and second display areas being configured to enable the output light trapped via TIR to be emitted from the layer.

2. The display system of claim 1, wherein the layer comprises a sheet of plastic or glass and the edge of the layer is coupled with at least one waveguide to the programmable light source.

3. The display system of claim 1, wherein the programmable light source comprises a strip of red-green-blue (RGB) light emitting diodes (LEDs) that is addressable by section or by pixel.

4. The display system of claim 3, wherein a first subset of the LEDs provides the output light to the first baffled segment and a second subset of the LEDs provides the output light to the second baffled segment and wherein the controller independently operates the first and second subsets of the LEDs to sequentially or concurrently illuminate the first and second display areas, whereby displayed images are animated.

5. The display system of claim 3, wherein the controller generates the control signals to vary over time at least one of color and brightness for the first and second baffled segments.

6. The display system of claim 1, wherein the first and second display areas comprise etched graphics on the sides of the first and second baffled segments.

7. The display system of claim 1, further comprises a second layer with an edge optically coupled to the programmable light source, wherein the second layer is arranged substantially parallel to the layer, wherein the second layer includes a third display area on a side of the layer facing the layer, and wherein the third display area is configured to enable a portion of the output light trapped via TIR in the second layer to be emitted from the second layer toward the layer.

8. The display system of claim 7, wherein the controller generates the control signals to provide the output light from the programmable light source to the second layer independently from the layer.

9. A display system adapted to display images with animation and depth, comprising:
    a light source;
    a first layer optically coupled to the light source to receive and trap via TIR first output light from the light source; and
    a second layer stacked upon the first layer and optically coupled to the light source to receive and trap via TIR second output light from the light source,
    wherein the first and second layers each comprises at least first and second segments optically separated and configured to independently receive portions of the first and second output light, and
    wherein each of the segments includes etched graphics upon a surface of a body of the segment, whereby light is output from the segments via the etched graphics to display an image with depth to a viewer in a viewing space.

10. The display system of claim 9, wherein the light source comprises an LED strip with a subset of RGB LEDs mated with each of the segments, whereby color, brightness, and timing of light fed into each of the segments is independently controllable.

11. The display system of claim 9, wherein the first and second layers are formed from sheets of clear plastic or glass with a thickness in the range of 50 microns up to 100 mm.

12. The display system of claim 9, wherein the surfaces containing the etched graphics are parallel and face the viewing space.

13. A display system adapted to display images with animation and depth, comprising:
    a programmable light source operating in response to control signals to output light;
    a first layer with an edge optically coupled to the programmable light source, whereby a first portion of the output light is trapped in the layer with total internal reflection (TIR), wherein the first layer is divided into first and second baffled segments, wherein a first optical barrier is inserted between the first and second baffled segments, and wherein a first display area is provided on the first baffled segment and a second display area is provided on the second baffled segment, the first and second display areas being configured to enable the first portion of the output light trapped via TIR to be emitted from the first layer; and
    a second layer with an edge optically coupled to the programmable light source, whereby a second portion of the output light is trapped in the layer with TIR, wherein the second layer is divided into third and fourth baffled segments, wherein a second optical barrier is inserted between the third and fourth baffled segments, and wherein a third display area is provided on the third baffled segment and a fourth display area is provided on the fourth baffled segment, the third and fourth display areas being configured to enable the second portion of the output light trapped via TIR to be emitted from the second layer toward the first layer.

14. The display system of claim 13, wherein the first and second layers each comprises a sheet of plastic or glass with a thickness in the range of 50 microns up to 100 mm.

15. The display system of claim 13, wherein the programmable light source comprises at least one strip of red-green-blue (RGB) light emitting diodes (LEDs).

16. The display system of claim 15, wherein the control signals are generated to vary over time at least one of color and brightness for the first, second, third, and fourth baffled segments.

17. The display system of claim 13, wherein the first, second, third, and fourth display areas each comprise etched graphics.

18. The display system of claim 13, wherein the control signals are configured to independently control illumination of the first, second, third, and fourth baffled segments.

19. The display system of claim 18, wherein two or more of the first, second, third, and fourth baffled segments are sequentially illuminated with the output light to provide a display with animation.

20. The display system of claim 19, wherein at least one of the first, second, third, and fourth baffled segments remains illuminated while another one of the first, second, third, or fourth baffled segments is illuminated differently over time.

\* \* \* \* \*